Aug. 16, 1938. F. SCHMIDT 2,126,708
TORSIONAL RUBBER SPRING
Filed Sept. 13, 1937
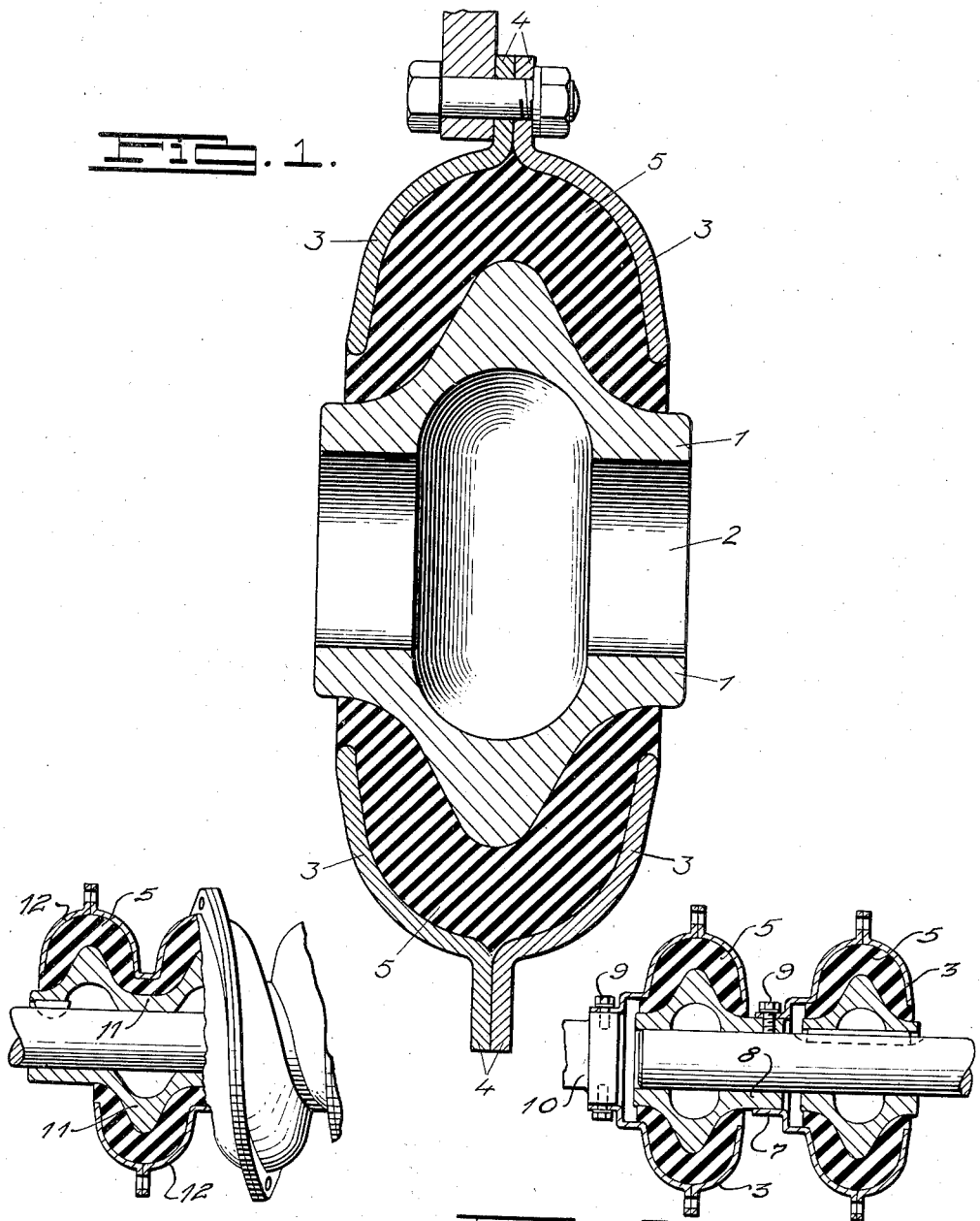
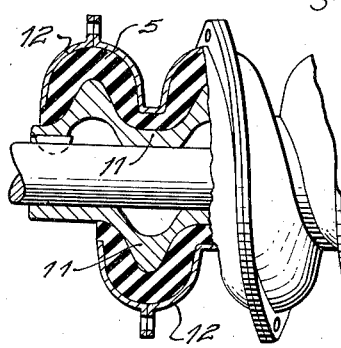
INVENTOR
Fritz Schmidt
BY
Harness, Dickey & Pierce.
ATTORNEYS.

Patented Aug. 16, 1938

2,126,708

UNITED STATES PATENT OFFICE 2,126,708

TORSIONAL RUBBER SPRING

Fritz Schmidt, Harburg-Wilhelmsburg, Germany, assignor to Metalastik Ltd., Leicester, England, a British firm Application September 13, 1937, Serial No. 163,639
In Germany March 9, 1936

5 Claims. (Cl. 267—63)

The invention relates to a rubber spring, in which the metal parts are connected with the rubber, by the use of adhesive or by vulcanizing it to them, in such wise that the adhesion between the metal and rubber equals or exceeds the tensile strength of the latter.

The object of the invention is to obtain an elastically soft or weak reaction to torsional forces, with simultaneous relative insensitivity to forces that act radially and axially. A further object is to provide such a device having a small axial constructional length, and corresponding small space requirements.

In the drawing, Figure 1 illustrates a form of construction of the invention in its simplest form, by means of a longitudinal section through the plane of symmetry passing through the center line of the spring;

Figs. 2 and 3 illustrate other forms of the invention.

The spring consists of the hub or core 1, which has a corrugated surface, and inside the bored hole 2 of which there is fastened the part whose rotary oscillations are, by means of the spring, to be made non-detrimental for the part that receives them. Concentrically with the hub 1, and partly surrounding it in cross section, is the metal jacket or housing 3, which consists of two symmetrical parts connected together by screws or by welding flanges 4 at their outer periphery. These flanges 4 also serve to connect the spring with the base, frame, foundation, or the like. A rubber mass 5 is inserted so that it adheres tightly, or is vulcanized to the hub 1 and the metal casing 3.

The cross-sectional shape of the metal parts 1 and 3 is such that the rubber mass, situated between them, has, in accordance with the purpose of the invention, no appreciable opportunity to deflect in radial and axial directions, because the free rubber surfaces between the inner rims of the metal casing 3 and the hub 1 are made of suitably small dimensions. There is consequently also no support needed against the radial stresses created in an auxiliary manner by the turning moment. In contrast to this, the elastic flexibility of the rubber may be fully utilized as regards torsional stresses, because in this case no outward forcing occurs. The degree of this flexibility in angular measurement $\alpha$ may be adapted to the purpose being considered by the selection of rubber of various hardnesses, without it being necessary, within wide limits, to alter the dimensions of the spring.

In cases in which it is advantageous to alter the flexibility or the load capacity of a spring beyond the upper or lower limit of a single spring, but still retain the diameter, and also make it possible to use the vulcanizing mold for single springs, single springs are disposed in axial sequence adjacent to one another. The action of the entire spring may be varied, in accordance with the type of the connection of the metal parts of all the single springs with the part stressed in oscillations on the one hand, and on the other hand in accordance with their connection with the supporting part. If for example the hubs 1 of all the single springs are connected with the oscillating part, and if the metal casings 3 are all likewise connected together and with the supporting part, a foundation for example, then in this case the resistance of the rubbers 5 are added together as many times as there are single springs. This forms a kind of connection in parallel.

If on the contrary, and as shown by Fig. 3, the drive shaft, indicated at 6, is keyed only with the hub 1 of the first spring, while the other hubs will turn thereon, while the casing of this spring is connected with the hub of the second spring by extended parts 7 and 8 and bolts 9, and so on and finally the last casing is connected to a part 10 to be resiliently connected to the shaft, then the flexibility of the spring is increased as many times as there are single springs. This type of connection, as compared with the type previously described, may be described as connection in series. In continuation of the idea that has just been developed, there may naturally also be combinations of single springs in which the connection is partly connection in parallel and partly connection in series. Such combinations have the advantage that elements of uniform construction are always used, whereby their manufacture is made more economical.

A further possibility of strengthening the spring without altering its diameter consists in both the hub 1 as well as the metal casing 3 having threaded forms, as shown by Fig. 2 at 11 and 12, so that they fit inside one another like a threaded bolt and nut, the space between however being filled in with rubber. The mechanical action of such a spring differs from that of the form of construction previously described in that, when the hub 1 rotates relatively to the metal casing 3, axial shear occurs inside the rubber mass, which finally leads to retarding of the twisting movement. Such a type of action is however desirable, and when the spring is used as a driving coupling, wherein the hub and casing are fixed axially, has the further advantage that when the rubber is destroyed, the connection between the driving and the driven parts is not disconnected, but is maintained through the threaded portion on the hub 1 clamping tightly against one side of the nut-shaped metal casing 3. The manufacture of such rubber-metal parts is moreover simpler to the extent that the core of the mold, the hub 1, and the mold jacket, the metal casing 3, may both be made as single parts, without the introduction of the unvulcanized rubber mass being thereby made difficult.

What is claimed is:

1. A torsional rubber connection comprising an inner hub member having an undulated cross section, a housing of bell shaped axial cross-section around the hub and enclosing the undulation on the hub, and rubber completely filling the space between the housing and hub and adhering to both and comprising the sole bearing support between the hub member and the housing, the construction of the housing and hub member being such that the edges of the housing are substantially closer to the hub member as compared to other parts of the housing so as to provide a restricted opening to limit flow of rubber therethrough.

2. A torsional rubber connection comprising an inner hub member having external thread elements, a hollow housing extending in a threading manner around the hub in correspondence with the thread element on the latter and enclosing said element, and rubber between the housing and thread element and adhering to both, said rubber comprising the sole bearing support between the inner member and the housing.

3. In combination, an axially fixed inner member having a spiralled element on its surface, an axially fixed outer member having a spiralled portion extending along the first element, one of said members constituting the driving member and the other the driven member, and rubber between said spiralled element and said spiralled portion and adhering thereto, said rubber comprising the sole bearing support between the inner member and the outer member.

4. In combination, an axially fixed inner member having a spiralled element on its surface, an axially fixed outer member having a spiralled portion extending along the first element, one of said members constituting the driving member and the other the driven member, and rubber between said spiralled element and said spiralled portion and adhering thereto, said spiralled portion comprising a spiralled housing member of bell shape axial cross-section which encloses the spiralled element on the inner member, said rubber comprising the sole bearing support between the inner member and the outer member.

5. In combination, a pin, a part to be resiliently connected thereto, a hub on the pin and turnable therewith, a second hub turnable on the pin, a member extending around the first hub, a member extending around the second hub, rubber between each member and its hub and adhering to both, means connecting the first member to the second hub so that they turn together, and means connecting said second member to said part.

FRITZ SCHMIDT.